United States Patent
Fauble et al.

[11] Patent Number: 5,941,286
[45] Date of Patent: Aug. 24, 1999

[54] COMPOSITE FUEL AND VAPOR BARRIER TUBE AND PROCESS FOR MAKING SAME

[75] Inventors: Michael K. Fauble; Glenn V. Dukes, both of Cadillac; William Troy Browder, Marion, all of Mont.

[73] Assignee: Cadillac Rubber & Plastics, Inc., Cadillac, Mich.

[21] Appl. No.: 08/535,084

[22] PCT Filed: Jun. 30, 1994

[86] PCT No.: PCT/US94/07375

§ 371 Date: Oct. 13, 1995

§ 102(e) Date: Oct. 13, 1995

[87] PCT Pub. No.: WO96/00657

PCT Pub. Date: Jan. 11, 1996

[51] Int. Cl.[6] .................................................. F16L 11/04
[52] U.S. Cl. ................... 138/137; 138/141; 138/DIG. 1; 138/DIG. 3
[58] Field of Search .................. 138/137, 140, 138/141, DIG. 1, DIG. 3

[56] References Cited

U.S. PATENT DOCUMENTS

| | | |
|---|---|---|
| 4,361,608 | 11/1982 | Furukawa et al. . |
| 4,394,205 | 7/1983 | Blenner . |
| 4,395,462 | 7/1983 | Polmanteer . |
| 4,422,991 | 12/1983 | Phillips . |
| 4,457,799 | 7/1984 | Dunn . |
| 4,556,589 | 12/1985 | Neumann et al. . |
| 4,559,973 | 12/1985 | Hane et al. . |
| 4,806,351 | 2/1989 | Sugimoto et al. . |
| 4,881,576 | 11/1989 | Kitami et al. . |

(List continued on next page.)

FOREIGN PATENT DOCUMENTS

| | | |
|---|---|---|
| 0 523 644 | 1/1993 | European Pat. Off. . |
| 0 551 094 | 7/1993 | European Pat. Off. . |
| 0 559 445 | 9/1993 | European Pat. Off. . |
| 0 582 301 | 2/1994 | European Pat. Off. . |
| 0 616 160 | 9/1994 | European Pat. Off. . |
| 2 577 564 | 2/1985 | France . |
| 36 13 188 | 10/1986 | Germany . |
| 40 01 227 | 7/1990 | Germany . |
| 43 10 159 | 10/1993 | Germany . |
| 43 11 549 | 10/1993 | Germany . |
| 2 204 932 | 11/1988 | United Kingdom . |

OTHER PUBLICATIONS

Manfred Tschach, Neue Entwicklungen auf dem Gebiet der Fluorkunststoffe, from PLASTverarbeiter 35, Jan. 1963, Nr 10, pp. 1137 and 1138.

(List continued on next page.)

*Primary Examiner*—James F. Hook
*Attorney, Agent, or Firm*—Rader, Fishman, Grauer & Mc Garry

[57] ABSTRACT

Automotive filler tubes require resistance to usual hydrocarbon fuel and mechanical properties to withstand collision forces. Tubes are fabricated from laminated rubbery structure reflecting the cooperative use of selected fluoropolymeric materials laminated with a rubbery copolymer like an epichlorohydrin elastomer to provide a flexible tubular article permitting only negligible escape of confined volatile hydrocarbons. A FKM rubbery polymer forms a relatively thin inner layer in the tube, a THV polymer forms a relatively thin intermediate layer and a relatively thick elastomeric polymer, e.g., ECO, forms a cover layer. In an alternative embodiment, a tube is formed from an inner layer of a THV fluoroplastic polymer and a cover layer of a relatively thick elastomeric polymer. The tubing is made by coextruding the FKM rubbery polymer and the THV fluoroplastic polymer, coating the THV fluoroplastic polymer layer with a binder, crosshead extruding the elastomeric polymer layer and cutting the tubing to lengths. The lengths are given a partial cure in straight condition to cross-link the THV fluoroplastic layer to the FKM rubber polymer layer and to the elastomeric layer. The partially cured lengths of tubing are shaped and then fully cured.

24 Claims, 4 Drawing Sheets

U.S. PATENT DOCUMENTS

| | | | |
|---|---|---|---|
| 4,984,604 | 1/1991 | Nishimura | 138/125 |
| 5,093,166 | 3/1992 | Nishimura | 138/137 |
| 5,284,184 | 2/1994 | Noone et al. | 138/122 |
| 5,320,888 | 6/1994 | Stevens . | |
| 5,356,681 | 10/1994 | Ichikawa et al. | 138/137 |
| 5,383,087 | 1/1995 | Noone et al. | 138/137 |
| 5,518,035 | 5/1996 | Hoshishima et al. | 138/137 |
| 5,527,858 | 6/1996 | Blong et al. | 525/187 |
| 5,566,720 | 10/1996 | Cheney et al. | 138/141 |
| 5,570,711 | 11/1996 | Walsh | 138/137 |
| 5,588,469 | 12/1996 | Kakiuchi et al. | 138/141 |
| 5,679,425 | 10/1997 | Plumley | 138/137 |

OTHER PUBLICATIONS

3M, THV Fluoroplastic Technical Information, THV 500G, © 3M, Jan. 1993, two (2) pages.

3M, THV Fluoroplastic Technical Information, THV 400G, © 3M, Jan. 1993, two (2) pages.

3M, THV Fluoroplastic Technical Information, THV 350 C, © 3M, Jan. 1993, two (2) pages.

3M, THV Fluoroplastic Technical Information, THV 200 G, © 3M, Jan. 1993, two (2) pages.

3M, THV Fluoroplastic Technical Information, THV 200 P, © 3M, Jan. 1993, two (2) pages.

3M, Dynamar Technical Information, Rubber Bonding Agent 5155, issued Jun. 1984, two (2) pages.

COMPOSITE FUEL AND VAPOR BARRIER TUBE AND PROCESS FOR MAKING SAME

BACKGROUND OF THE INVENTION

TECHNICAL FIELD

The present invention relates to the field of tubing manufacturing and in particular to the field of fuel and vapor transmission tubes for internal combustion engine vehicles. It further relates to laminated structures having flexibility, impact resistance and hydrocarbon impermeability suited for use as a fuel and/or vapor conducting tubing and to a process for making the same.

BACKGROUND OF THE INVENTION

It has been known in recent times to use a multilayered or laminated rubber structure serving as a fuel transporting hose for an automotive fuel feed line into a vehicle reservoir. The conduit wall may have three layers; a heat and gasoline-resistant inner tube; a weather-resistant outer tube and a reinforcing fiber matrix or layer interposed and integrated between the other two. Even so, partly oxidized, or "sour" gasoline and oxygenated fuel adversely affect a fuel hose life so that enhanced gasoline-resistant features are needed. The fluoropolymers FKM, a terpolymer of tetrafluoroethylene, hexafluoropropylene and vinylidine chloride, hereinafter, respectively, TFE, HFE, and $VF_2$, has exhibited satisfactory performance characteristics as a fuel resistant material. See, for example, U.S. Pat. No. 5,093,166, issued Mar. 3, 1992. However, it has proved difficult to bond an FKM layer to other rubbers. Further, FKM layers are not by themselves sufficiently impermeable to hydrocarbon vapors to enable automobile manufacturers to meet U.S. EPA standards for automotive vehicle emissions for 1995.

Thin layer THV, also a terpolymer of TFE, HFE, and $VF_2$, has been used as a hydrocarbon barrier lamina in tubular hoses. These hoses have been made by spirally wrapping a THV tape on a mandrel to form a tube, spirally wrapping a metal reinforcement around the tube, and spirally wrapping a chloroprene tape around the reinforcement. The resulting tubular hose is heated to fuse the THV layers together and to vulcanize the rubber layer. This process is cumbersome and relatively expensive.

As to the automotive fuel filler tubes, some are presently made of relatively thick-walled nylon plastic, which provides the desired resistance to the usual hydrocarbon fuels, like gasoline, diesel oil, and even liquid paraffins, for example, ethanol. However, thick-walled nylon plastic tubing does not have sufficient flexibility and impact resistance to withstand automobile collisions without fuel line rupture. Flexibility and resilience of the tubing is also required to route the tubing through a tortuous path in the vehicle.

Vapor tubes which are used to recycle fuel vapors (for pollution control) must be resistant to the combustion vapors as well as the fuel itself. One of the more recent tubular construction is a coextruded formed tubing, which involves an inner core of NBR rubber and an outer core of a chlorosulphonated polyethylene plastic (Hypalon from the DuPont Co.). But with the currently used laminated fuel tubular conduits, there is still a persistent hydrocarbon pollution problem, due in part to the relatively high gas vapor permeability of presently used polymeric materials. In order to acceptably be used as fuel filler tubes, the conduits of these materials require at least surface modifications that will essentially block or markedly reduce unused HC vapor transmission to the environment from the fuel tank.

For example, the available Nitrile/Hypalon-based tubing has an HC permeation resistance rating of about 600 $g/m^2$ per day vapor loss measurement using ASTM Reference Fuel C, while the federal EPA wants to reduce permeability emissions to about 2 g per day for the entire vehicle. To that end, the auto industry currently seeks to reduce permeability for the gasoline filler tube and other fuel lines, vapor lines and vent hoses essentially to zero, a goal that is addressed by the present invention.

SUMMARY OF THE INVENTION

According to the invention, a laminated rubbery structure includes the cooperative use of two fluoropolymeric materials having complementary physical properties and incorporating an adjacent layer of a rubbery polymer such as an epichlorohydrin elastomer used as an amorphous copolymer with ethylene oxide (ECO), all of which can be extruded in a continuous process to provide a resilient and bendable tubular article of very low hydrocarbon permeability, and is further well adapted for transport of volatile fuels.

The tubular sidewall comprises a core layer of an FKM fluoroelastomer, exhibiting the properties of a rubber, a second layer of THV fluoroplastic exhibiting the properties of a thermoplastic layer, these layers being relatively thin layers, and an external layer of a rubbery polymer such as an epichlorohydrin monomer (EC) copolymerized with ethylene oxide (EO) to form an epichlorohydrin polymer (ECO). This ECO layer is the relatively thicker layer in the laminate.

Preferably, the core layer of FKM includes a measurable amount of an electroconductive filler material, like carbon black, useful to confer the desired core layer with conductivity for discharge of static electricity.

In a preferred embodiment, a binder layer of an amine or an acrylic compound is coated onto the THV layer to bond the THV layer to the ECO layer.

The present laminated polymeric structures, when fabricated into fuel conduits, provide for bendability when forming is needed, permit some compression without rupture, and will also tolerate moderate elongation without rupture. The laminated sidewalls demonstrate very low hydrocarbon permeability, both as to liquids, like gasoline, and to hydrocarbon vapors. Conductivity of the laminate inner layer inhibits the build-up of static electricity in the fuel reservoir. Finally, this somewhat resilient laminated sidewall shows the ability to mechanically seal itself and elongate, in the event of sidewall breach incidental to a vehicle collision.

In another aspect of the invention, fuel filler or a vapor line tubing has an extruded inner layer of a THV fluoroplastic that can or cannot be conductive and an extruded outer layer of a rubbery polymer. A binder layer of an amine compound is preferably coated onto the THV layer to promote bonding between the THV layer and the rubbery polymer layer.

In accordance with still another embodiment of the invention, a laminate of the invention is made by coextruding the FKM and THV layers under pressure to mechanically bond these two layers together and then crosshead extruding the external rubbery polymer layer onto the THV layer. A primer or binder coating is preferably applied to the THV layer between the coextrusion and crosshead extrusion steps. During the extrusion process, the temperature of the FKM fluoroelastomer is maintained below about 300° F., preferably about 270° F., while the temperature of the THV fluoroplastic is maintained above 400° F., preferably about 450° F.

After the extrusion process, the tubing is cut to lengths and heated for a time and at a temperature which gives the tubing lengths a partial vulcanization to promote cross-linking between the THV fluoroplastic layer and the outer elastomer layer while it is in a straight condition. Thereafter, the length of tubing is bent into a desired configuration and heated for a time and at a temperature to give the shaped tubing a full vulcanization.

The aspects and advantages of the present invention will be better understood by reference to the detailed description of preferred embodiments and associated features but the invention is not intended to be limited thereto.

DETAILED DESCRIPTION OF THE PREFERRED EMBODIMENTS

Figure 1:
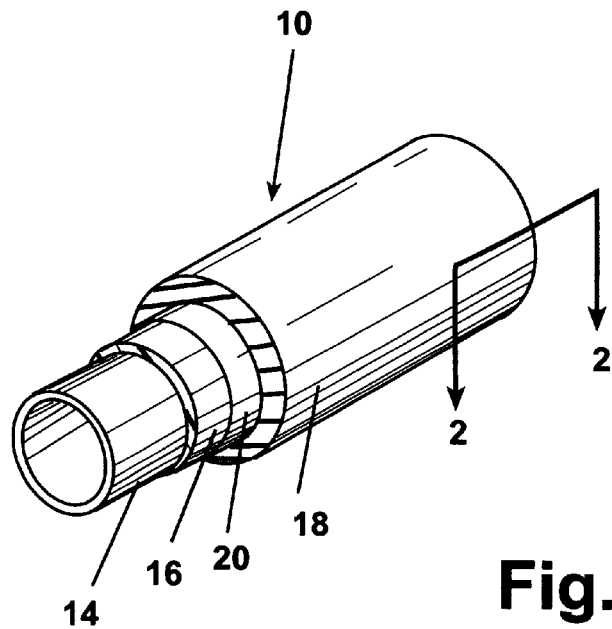
FIG. 1 is a perspective end view of a tube according to the invention.
Figure 2:
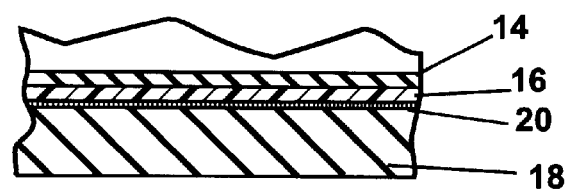
FIG. 2 is a sectional view of the tube shown in FIG. 1, taken along lines 2—2 of FIG. 1.

Referring now to the drawings, and to FIGS. 1 and 2 in particular, there is shown a tubular structure according to the invention. Preferably, the tube is used as an automotive fuel filler tube for gasoline and has a high degree of permeability. The tube has inner layer 14 of an FKM fluoropolymer, an intermediate layer 16 of a THV fluoropolymer, a relatively thick layer 18 of an elastomer and a thin binder coating 20 between the THV layer 16 and the elastomer layer 18.

The FKM fluoropolymers which can be used according to the invention have been available for some time. For example, the FLUOREL brand of fluoroelastomers, introduced by the 3M Company of Minnesota in the early 1960s, are suitable for use in this invention. These fluoroelastomers are TFE/HFP/VF$_2$ terpolymeric compositions, which are melt processable fluoro-plastics, providing a useful combination of performance and processing advantages without the need for organic additives. They are characterized by low processing temperature range (100° C. to 175° C.), co-processability with temperature-sensitive substrates, like non-fluorinated plastics, and elastomers, like ECO. They also are essentially amorphous and have the characteristics of elastomers, i.e., they are thermosetting compounds which exhibit a 100% stretch without deformation. Typically, the fluoroelastomers contain about 65–71% fluorine by weight. They also show excellent flexibility/elongation features with low flexural modulus, good flex fatigue life, and avoidance of stress cracking. They evince versatile bondability (hot melt adhesive) and a broad temperature service range.

These fluoroelastomers can have a relatively wide range of monomer ratios. These fluoroelastomers are generally described in U.S. Pat. No. 2,833,752, issued May 5, 1958 and U.S. Pat. No. 5,208,305, issued May 4, 1993, both of which patents are incorporated herein by reference. Generally, the TFE component can be present in the range of 0 to 70 weight parts, the HFP component can have a range of 20 to 50 weight parts and the VF$_2$ component can have a range of 20 to 80, based on 100 weight parts of FKM. The preferred fluoroelastomer is a fluoroelastomer sold by 3M Company under the designation FE5830Q. This polymer has about 33% VF$_2$, 24% TFE and 43% HFP, by weight.

Suitable FKM polymers are obtained, for example, by polymerizing a mixture of monomers consisting of 40 mol percent of TFE, 30 mol percent of HFP and 30 mol percent of VF$_2$, with the monomer mixture also containing up to 5 weight parts of a bisphenol cross-linking agent per 100 parts, by weight, of the three monomers and 1–20 parts of a basic metal oxide. This FKM composition is suited to a well-known extrusion process for forming the FKM layer 14.

The FKM polymer is compounded with various additives, such as carbon black, cross-linking agents and plasticizers for processability and for conductivity. FKM layer 12 is preferably conductive, as the result of additives such as carbon black. Other compounding ingredients include magnesium oxide, calcium hydroxide and carnauba wax.

The THV fluoropolymer used in the invention is a fluoroplastic terpolymer which is described in U.S. Pat. No. 5,055,539, issued Oct. 8, 1991. This patent is incorporated herein by reference. The terpolymer component of the THV layer comprises tetrafluoroethylene (TFE), hexafluoropropylene (HFP) and vinylidine fluoride (VF$_2$). The THV fluoroplastic polymers comprise the following polymerized units: (a) 20–50% by weight of VF$_2$; (b) 35–70% by weight of TFE; and (c) 10–30% by weight of HFP, with the proviso that the quantities of VF$_2$, TFE and HFP make up 100% by weight of the polymer component of the THV layer. The THV fluoroplastic polymer used in the invention is used without any further adjuvant compounds.

The THV fluoropolymer should be partially crystalline, that is, it should contain 10 to 70% by weight of crystalline components and have a crystalline melting point of 100–240 ° C., measured by differential thermal analysis. Polymers having a melting point of below 100° C. are generally too soft for the intended application. Polymers having a melting point above 240° C. are more difficult to process in the intended application. THV 500 grade sold by 3M Company is the preferred compound used in the invention, although the THV 200, 350 and 400 grades can also be used. These THV fluoropolymers are thermoplastic in nature, i.e., they melt when heated and are subject to elastic deformation at 100% elongation.

The THV fluoroplastic polymers typically have specific gravity ranges from 1.95 to 1.98 g./cc ASTM 792), melting range from 115° C. to 180° C. (DSC), a melt flow index from 5–25 (265C/5 kg.)(ASTM 1238) in powder and pellet form and 35–60 (265C/5 kg.) (ASTM 1238) in aqueous dispersions. THVs have a tensile stress at break of 20 N/mm (ASTM 638) and elongation at break 500–600 percent (ASTM 638), a limiting oxygen index of 75 (ASTM 2863) and flammability rating of V0 (UL 94).

The employment of THV 500G grade fluoroplastic, in the form of granules (pelleted is the preferred material), is suitable for melt processing into a coextruded formed article with FKM and ECO polymers. The lower melting point of the THV polymers provides for a more complete and uniform fusing of the THV to itself and to the adjacent FKM polymer layer.

The THV fluoroplastic polymers have the advantage of being an easily extrudable material which is flexible and crystalline. Further, they are bondable to the other substrates and have relatively low temperature processability. They are non-corrosive and have relatively high elongation properties.

The elastomeric compound should have one or more of the following properties: ozone and weather resistance, fuel resistance, flame resistance and it must adhere to the fluoroplastic polymer. The elastomeric compound used as layer 18 can be selected from various vulcanizable elastomeric compounds of any known natural rubber or synthetic rubber stock and including, without limitation, epichlorohydrin elastomers including ECO copolymer, styrene-butadiene rubber (SBR), of both high and low durometer grades and oil-extended types; neoprene (G and W types); ethylene-propylene copolymer and terpolymer rubbers; butyl rubber; acrylonitrile-butadiene rubber; chlorosulfonated polyethylene rubber; fluorinated polyethylene; CSM; CPE and NBR/PVC. Preferably, the elastomeric compound is an ECO copolymer. The elastomeric rubber is compounded with the usual compounding ingredients, such as cross-linking agents, carbon black, plasticizers, and the like.

Copolymers with 40% EO (the equimolar amount) are useful rubbers for elastomer layer 18, having excellent resistance to oils and ozone and low gas permeability. The polymers are vulcanized by well known methods employing the use of thioureas and basic metallic oxides. The resulting copolymer is primarily amorphous, with only a small degree of crystallinity. The good gasoline resistance of ECO and its low-temperature flexibility, make it especially useful for inclusion in the automotive parts articles of the present invention.

The binder layer 20 can be any suitable binder material to promote the adhesion of the FKM layer 16 to the elastomer layer 18. Preferably these compounds are amine compounds or acrylic compounds. An example of a suitable binder is Dynamar FC 5155 sold by the 3M Company of St. Paul, Minn. Examples of suitable amine compounds include 1,2-ethanediamine, N[3-(trimethoxysilyl)propyl]-methane amine, N-methyl-. An example of a suitable acrylic binder compound is an ethylene acrylic elastomer compound. The ethylene acrylic elastomer is sold by the du Pont company under the trade name of Vamac.

The FKM layer 14 can vary somewhat but is generally kept relatively thin. Generally, the FKM layer 14 is in the range of 0.25 to 1.00 mm, preferably in the range of 0.50 to 0.75 mm thick.

The THV layer 16 can also vary widely but is selected to give the appropriate barrier to hydrocarbons in conjunction with the FKM layer 14. Generally, the THV layer will be in the range of 0.10 to 0.50 mm, preferably in the range of 0.20 to 0.25 mm.

The elastomer layer 18 is relatively thick, and forms the bulk of the tubing wall. The thickness of the elastomeric layer 18 can vary over a wide range but typically will fall in the range of 1.5 to 5.0 mm thick, preferably in the range of 3.0 to 3.5 mm. The binder layer 20 is relatively thin, and is in the nature of a coating.

Figure 3:
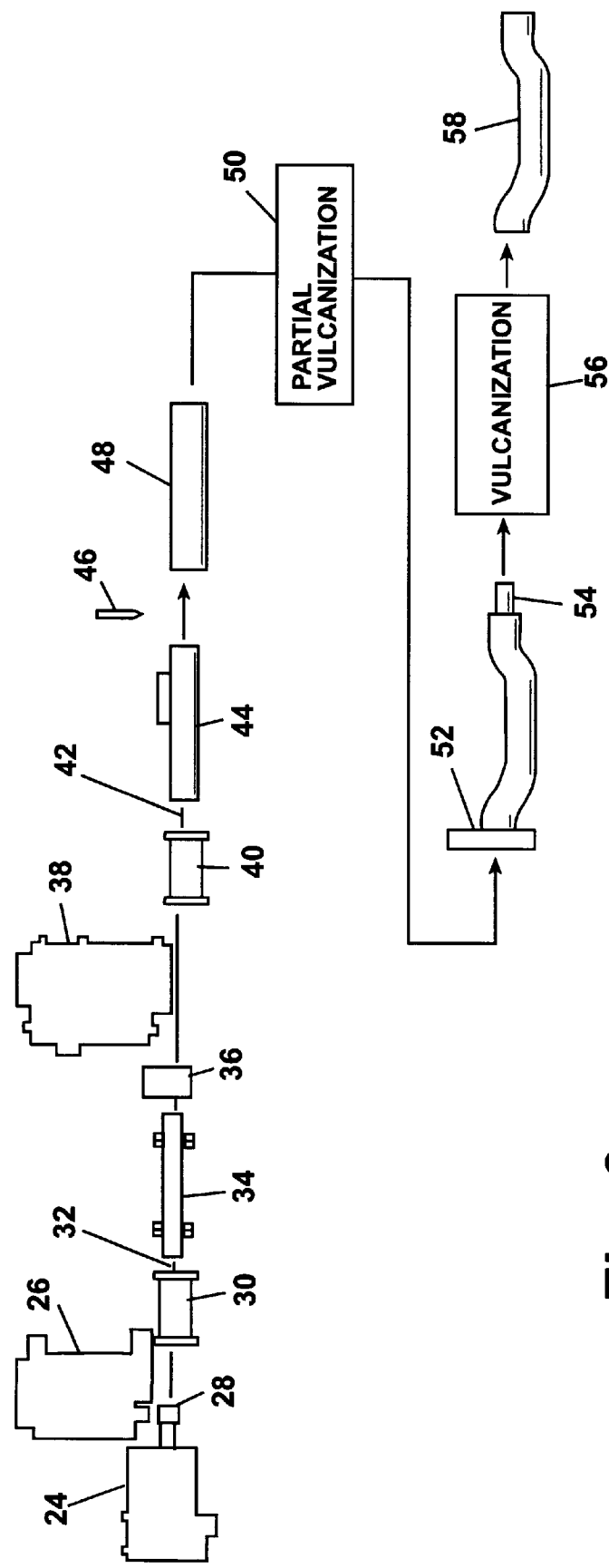
FIG. 3 is a schematic representation of a process according to the invention for making the tube shown in FIGS. 1 and 2.

Referring now to FIG. 3, there is shown in schematic form a process for producing tubing according to the invention. A rubber extruder 24 and a plastic extruder 26 have extrusion openings connected to a dual extrusion die 28 for extruding a two-layer tube. The extruders 24 and 26 heat the FKM and THV to suitable processing temperatures and coextrude the two under pressure through the dual extrusion die 28 to form a tubing having an inner layer of FKM and an outer layer of THV. The temperature of the FKM is controlled in the extruder so that it does not overheat due to the relatively elevated temperature of the THV. The temperature of the THV is kept above about 400° F., preferably about 450° F., while the temperature of the FKM is kept below 300° F., preferably about 270° F., during the coextrusion process. The tubing 30 is pulled from the die 28 and is passed through an air cooler 34 and a binder coater 36 wherein a binder coating is uniformly applied to the outer layer of THV. The tubing 32 is then passed through a crosshead extruder 38 which extrudes an elastomer layer 18 onto the coated tubing 32. To this end, the crosshead extruder 38 has a rubber extruder for feeding an elastomeric compound such as ECO into a crosshead extrusion die through which the coated tubing passes. The rubber extruder heats the elastomeric compound to a processing temperature at which it can be extruded onto the coated tubing 32. A puller 40 pulls the composite tubing 42 from the crosshead extruder 38. The tubing 42 is then cut to lengths 48 with a knife 46 in a well known operation. The length of tubing is given a relatively light vulcanization treatment in a partial vulcanization chamber 50 by heating the tubing lengths in straight condition to a temperature in the range of 200° F. to 300° F. for a period of about 30 to 180 minutes. This partial vulcanization step is carried out while the tubing is straight to cross-link the outer elastomer layer 18 to the THV fluoroplastic layer 16. The length of tubing 48 is then placed onto a shaping device 52, for example, having a mandrel 54 to give a shape to the tubing. The shaped tubing is then vulcanized in a vulcanizing oven 56 to vulcanize the elastomeric composition in the layer 18 as well as the FKM layer 14. The vulcanization takes place in a well known process. After vulcanization, the shaped and vulcanized tubing 58 is removed from the shaping device 52 and subsequently cooled.

Conceivably, the binder coating step can be eliminated and the crosshead extruder 38 can be positioned at the dual extrusion die 28 to make a three-layer extrusion. A triple extrusion die can be used for this purpose.

The laminated resilient structure of this invention is adaptable to be formed into various shapes such as the tubular article of FIG. 1, shown after extrusion by the method of the invention, but seen prior to its shaping and vulcanization to adapt to a particular auto fuel filler tube. The resulting resilient articles of variable lengths, and of differing configurations (due to the internal geometry of the autos), present an organic chemical and weather-resistant fluid conduit, permitting only negligible escape of volatile HC vapors, due to enhanced sidewall gas impermeability.

Figure 4:
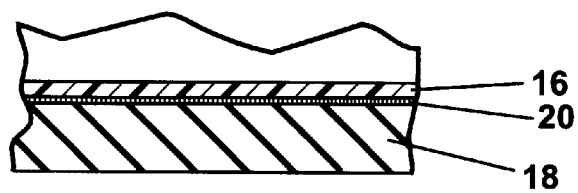
FIG. 4 is a sectional view, like FIG. 2, of a second embodiment of the invention.

Referring now to FIG. 4, there is shown a second embodiment of the invention wherein like numerals have been used to describe like parts. In this embodiment of the invention, the FKM fluoroelastomer layer 14 has been eliminated. A tubing formed with the construction shown in FIG. 4 includes an inner layer of THV thermoplastic 16, an elastomeric layer 18 and a binder coating 20 between the elastomeric layer 18 and the THV fluoroplastic layer 16. A tubing according to this construction can be used for fuel filler neck hoses or vapor tube applications.

The tubing made in accordance in FIG. 4 can be made in a process similar to that illustrated in FIG. 3 and described above with the exception that the rubber extruder 24 is eliminated. Otherwise, the process can be the same. Alternatively, the THV thermoplastic layer 16 and the elastomeric layer 18 can be extruded in a dual extrusion process with or without the application of the binder coating 20.

EXAMPLE

Flexible tubular articles fabricated according to the present invention were produced in the following manner:

Hose Construction #1

Inner Layer: Formulated FKM[1]
Barrier Layer: THV 500G

Binder Layer: Dynamar FC5155
Outer Layer: Formulated ECO[2]

Process

1. Mix FKM
2. Mix ECO
3. Co-extrude FKM & THV
4. Cool
5. Apply binder layer
6. Cross-head extrude ECO over FKM & THV
7. Cool
8. Cut to length
9. Pre-vulcanize
10. Load on shaping mandrels
11. Vulcanize
12. Remove from mandrels
13. Cool
14. Trim Hose Fabrication #2

Barrier Layer: THV 500G
Binder Layer: Dynamar FC5155
Outer Layer: Formulated ECO Process 1. Mix ECO
2. Extrude THV
3. Cool
4. Apply binder layer
5. Cross-head extrude ECO over THV
6. Cool
7. Cut to length
8. Load on shaping mandrels
9. Vulcanize
10. Remove from mandrels
11. Cool
12. Trim

| Constituent | Content (Parts per 100 Rubber) |
| --- | --- |
| Formulated FKM[1] | |
| FKM Polymer | 100.00 |
| Carbon Black | 20.00 |
| Plasticizer | 5.00 |
| Carnauba Wax | 0.50 |
| Calcium Hydroxide | 3.00 |
| Magnesium Oxide | 9.00 |
| Calcuim Oxide | 7.00 |
| Formulated ECO[2] | |
| ECO Polymer | 100.00 |
| Hydrocarbon Resin | 15.00 |
| Stearic Acid | 1.25 |
| Antioxidant | 1.00 |
| Calcium Oxide | 10.00 |
| Antimony Oxide | 5.00 |
| Carbon Black | 75.00 |
| Plasticizer | 5.00 |
| Vulcanizing Agent | 1.0 |
| Accelerator | 1.75 |

The various layers of the hose construction exhibited the properties listed below:

PHYSICAL PROPERTIES

| Material Properties | FKM | ECO | THV |
| --- | --- | --- | --- |
| Original Physicals | | | |
| Hardness, Shore A | 82 | 69 | 95 |
| Modulus @ 100% Elongation, MPa | 4.8 | 4.5 | 7.0 |
| Tensile Strength, MPa | 11.0 | 12.5 | 14.5 |
| Elongation, % | 294 | 267 | 520 |
| After Oven Aging 168 hours @ 125° C. | | | |
| Hardness Change, points | +8 | +10 | 0 |
| Tensile Strength Change, % | +14 | +4 | −31 |
| Elongation Change, % | −35 | −34 | −3 |
| After Oven Aging 168 hours @ 125° C. | | | |
| Hardness Change, points | +12 | −7 | −13 |
| Tensile Strength Change, % | −26 | −41 | −5 |
| Elongation Change, % | | | |
| After ASTM Fuel C Immersion, 70 hours @ 23° C. | | | |
| Hardness Change, points | | −2 | −5 |
| Tensile Strength Change, % | | −15 | −18 |
| Elongation Change, % | | −16 | −8 |
| Volume Change, % | | +3 | +10 |
| After 75% ASTM Fuel C + 25% Methanol Immersion, 70 hours @ 23° C. | | | |
| Hardness Change, points | | −11 | 0 |
| Tensile Strength Change, % | | −27 | −22 |
| Elongation Change, % | | −25 | −8 |
| Volume Change, % | | +13 | +24 |
| After ASTM #3 Oil Immersion, 70 hr @ 125° C. | | | |
| Hardness Change, points | | +2 | |
| Tensile Strength Change, % | | +4 | |
| Elongation Change, % | | −15 | |
| Volume Change, % | | +3 | |
| Permeation - SAE J30 28 days @ 23° C., g/sq.m./24 hrs | | | |
| ASTM Fuel C | | | 2 |
| 75% ASTM Fuel C + 25% Methanol | | | 4 |

| Burst Strength, Mpa | Original | After 42 days Filled with Fuel C | After 42 days Filled with M25 |
| --- | --- | --- | --- |
| 19 mm ID | 1.03 | 0.97 | 0.96 |
| 28 mm ID | 0.76 | 0.76 | 0.73 |
| 38 mm ID | 0.48 | 0.43 | 0.45 |
| 48 mm ID | 0.40 | 0.35 | 0.37 |
| Electrical Conductivity, megaohms | | | 1 |

| Adhesion, kN/m | |
| --- | --- |
| Original | Stock tear; cannot separate |
| After 42 days Filled with Fuel C | Stock tear; cannot separate |
| After 42 days Filled with M25 | Stock tear; cannot separate |
| Flexibility after 8 days @ 150° C. | No Cracks |
| Ozone Resistance, 70 hours @ 100 PPHM, 40° C. | No Cracks |
| Low Temperature Flexibility @ −40° C. | No Cracks |
| After 70 hr Filled with Fuel C, Fuel Drained, then aged 70 hr @ −40° C. | |

A brief cataloging of the several figure graphs is provided to better relate them to the laminate compositions of the prior art and to the disclosed embodiments of the present invention.

Figure 5:
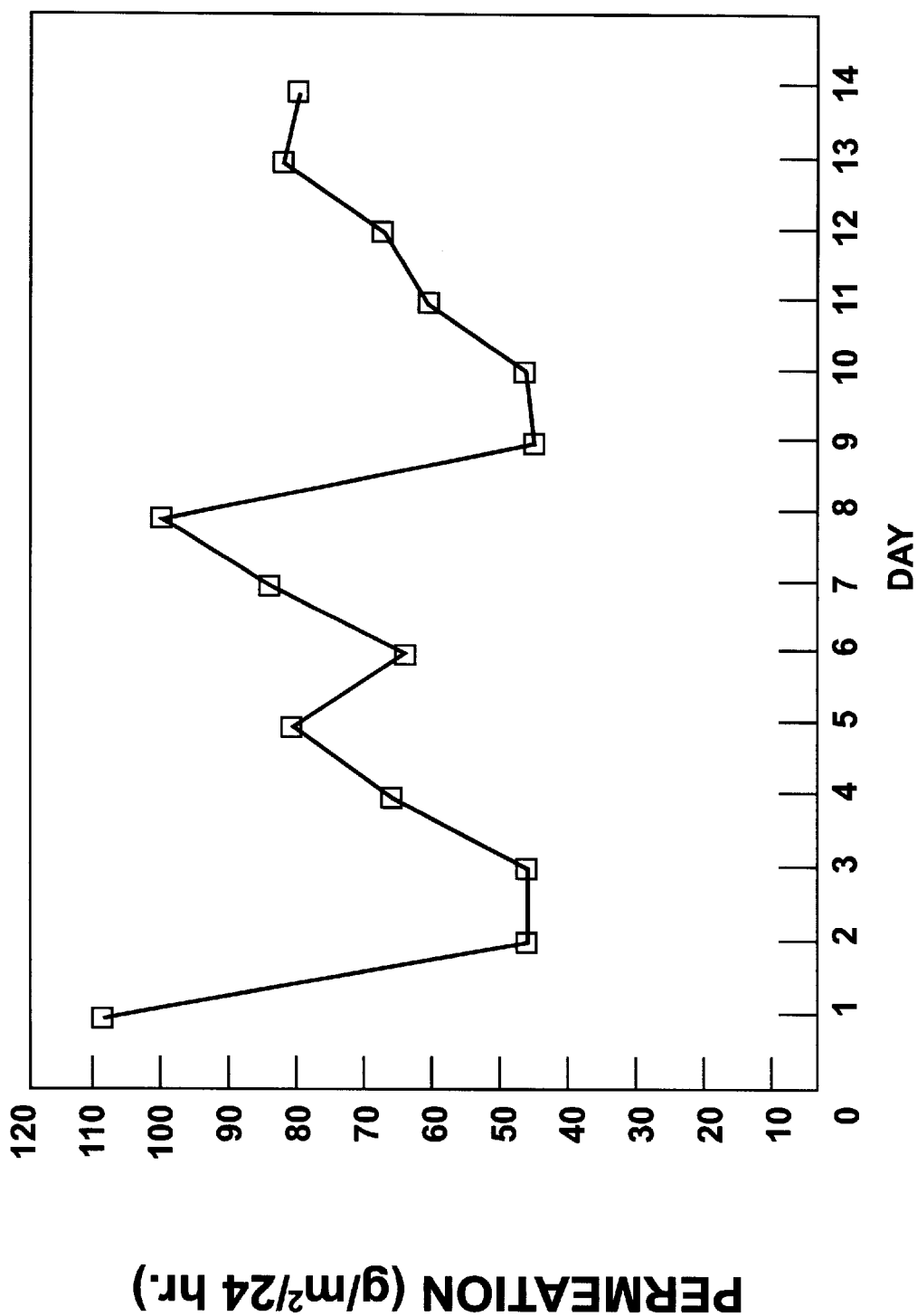
FIG. 5 is a graph of plotted performance data for a laminated sidewall evaluated against gasoline vapor permeation according to a prior art construction.

FIG. 5 reflects permeation test results for a FKM fluoropolymer/ECO elastomer laminate of the prior art evaluated for its gasoline resistance under SAE J-30 standards. Fuel resistance of the laminate (FKM layer surface) is measured by gasoline permeation in grams/M$^2$/24 hrs.

Figure 6:
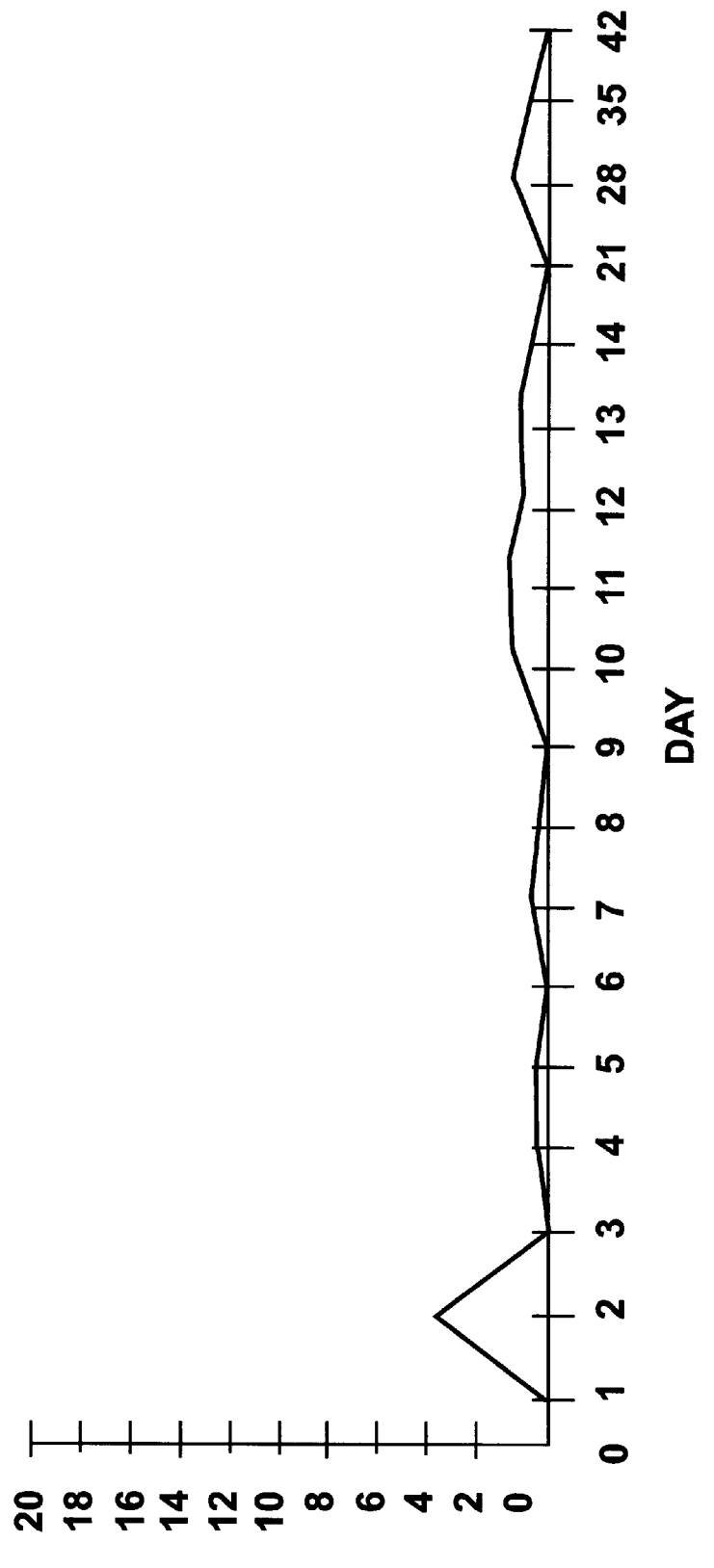
FIG. 6 is a graph of plotted performance data for a laminated sidewall evaluated against gasoline vapor permeation for a laminate according to the invention.

FIG. 6 reflects test results for an FKM/THV/ECO polymeric laminate (hose construction #1) made according to the invention. This laminate was evaluated under SAE J-30 standards for gasoline permeation by M25 fuel (fuel C)

under the same temperature and time parameters as in data represented in FIG. 5.

The graph of FIG. 5 displays substantial daily weight loss of test gasoline from the receiver over fourteen days, from 110 down to 45 grams/M². The laminate of FIG. 6 is appreciably superior in permeation resistance to that of FIG. 5, even over a 42-day period.

The present invention (FIG. 6) reveals excellent, extended levels of permeation resistance (SAE J-30) up through 42 days, which is appreciably better than the prior art laminate of FIG. 5.

When contrasting the performance data of the prior art laminate depicted in FIG. 5 to that of the invention shown in FIG. 6, the degree of improvement approaches an order of magnitude, as measured by weight loss from the formed container per unit area over extended time periods. These challenging test conditions exaggerate those experienced in auto industrial uses wherein the gasoline only intermittently (upon tank filling) contacts the laminated conduit. The filling tube does, however, continuously experience gasoline vapor pressure from the fuel tank throughout vehicle use.

Thus, it may be fairly concluded that a laminated fluoroplastic/rubber structure, fabricated in accord with the present invention, performs a superior function as measured by the markedly reduced permeability to volatile hydrocarbons.

In addition, the dual fluoropolymer use will permit a reduced thickness so as to improve the resiliency of the laminated conduit with attendant savings in the need for these costly, special purpose elastomeric systems.

Tubing according to the invention can be used in automotive applications for fuel lines, vapor lines, fuel filter and vent hoses. The tubing according to the invention is advantageously made by extrusion processes which determine the internal and external diameter of the tubing. The processes for making the tubing are economical.

Whereas the invention has been described with reference to a single elastomeric layer 18, the invention can also be used to make reinforced tubing. The same process as described above can be carried out to make the reinforced tubing except that there would be the additional steps of applying a reinforcement to the outer surface of the elastomeric layer 18, coating a second binder layer onto the reinforcement and crosshead extruding an additional elastomeric layer 18 over the reinforcement. The reinforcing layer can be a conventional reinforcing material, including natural and synthetic woven and knitted fabrics and metal wires. The elastomeric outer layer can be applied in a conventional crosshead extruding process in the same way as described above with respect to the application of the elastomeric layer 18.

While the present invention has been described in an illustrative manner, it is to be understood that the invention may be embodied with various changes, modifications and improvements, that may occur to those skilled in the art reading the specification, without departing from the spirit and scope of the invention as defined in the appended claims.

The embodiments of the invention in which an exclusive property or privilege is claimed are defined as follows:

1. A flexible tubular article for transport of volatile hydrocarbons permitting only negligible escape of such vapors comprising:

(a) a relatively thin, inner layer of an elastomeric form of an FKM fluoropolymer, and;

(b) a relatively thin intermediate layer of a thermoplastic form of a THV fluoropolymer extruded in tubular form over the inner FKM layer, the FKM inner layer and the intermediate THV layer together having a transverse thickness sufficient to present a barrier to volatile hydrocarbon escape, and (c) a relatively thick layer of an elastomeric polymer bonded to the outside surface of the intermediate layer and being coextensive therewith.

2. The article according to claim 1 wherein the thickness of the inner layer ranges from 0.25 to 1.00 mm.

3. The article according to claim 2 wherein the thickness of the intermediate layer ranges from 0.10 to 0.50 mm.

4. The article according to claim 3 wherein the thickness of the elastomeric polymer layer ranges from 1.5 to 5.0 mm.

5. The article according to claim 4 wherein the elastomeric polymer is an ECO polymer.

6. The article according to claim 1 and further comprising a relatively thin binder coating between the intermediate and elastomeric polymer layers.

7. The article according to claim 6 wherein the binder coating comprises an acrylic compound.

8. The article according to claim 1 wherein the thickness of the inner layer ranges from 0.50 to 0.75 mm.

9. The article according to claim 1 wherein the thickness of the intermediate layer is in the range of 0.20 to 0.25 mm.

10. The article according to claim 1 wherein the thickness of the elastomeric polymer layer ranges from 3.0 to 3.5 mm and the elastomeric polymer is an ECO polymer.

11. A process for making a tubular article which is substantially impermeable to volatile hydrocarbons, said process comprising the steps:

(a) coextruding a thermoplastic form of a THV fluoropolymer with a first elastomeric polymer in a tubular shape; and (b) crosshead extruding onto the tubular shape a relatively thick layer of a second elastomeric polymer to form a composite tubular article.

12. A process according to claim 11 and further comprising the step of coating the tubular shape with a binder coating to bond the THV fluoropolymer to the elastomeric polymer prior to the crosshead extruding step.

13. A process according to claim 12 wherein the binder layer comprises an acrylic compound.

14. The process according to claim 11 wherein the co-extruding step comprises extruding a layer of the THV fluoropolymer onto a layer of the first elastomeric polymer so that the first elastomeric polymer forms the innermost layer in the tubular shape.

15. The process according to claim 11 wherein the thickness of the first elastomeric polymer layer is in the range of about 0.25 to about 1.00 mm.

16. The process of claim 15 wherein the thickness of the THV fluoropolymer layer is in the range of about 0.10 to about 0.50 mm.

17. The process of claim 16 wherein the thickness of the elastomeric polymer layer is in the range of about 1.5 to about 5 mm.

18. The process according to claim 11 wherein the first elastomeric polymer is an FKM fluoropolymer and the innermost layer in the tubular shape is the FKM fluoropolymer which has a thickness in the range of about 0.50 to about 0.75 mm; wherein the intermediate layer is the THV fluoropolymer and has a thickness in the range of about 0.20 to about 0.25 mm and the thickness of the elastomeric polymer outer layer is in the range of about 3.0 to about 3.5 mm; and wherein the elastomeric polymer layer is an ECO polymer.

19. A process according to claim 11 and further comprising the steps of cutting the composite tubular article to lengths, partially curing the composite tubular article in straight condition to cross-link at least the elastomeric polymer layer to the THV fluoroplastic polymer, shaping the partially cured composite article and fully curing the shaped composite article.

20. A process for making a tubular article according to claim 11 wherein the first elastomeric polymer is an FKM fluoropolymer.

21. A flexible tubular article for the transport of volatile hydrocarbon vapors and vaporous combustion products and permitting only negligible escape of such vapors comprising:

(a) a relatively thin extruded tubular layer of a thermoplastic form of a THV fluoropolymer providing a barrier to volatile hydrocarbon vapor escape, said thin extruded tubular layer having an inner surface and an outer surface; and (b) a relatively thick extruded tubular layer of an elastomeric polymer bonded to the outer surface of the THV fluoropolymer layer and being coextensive therewith.

22. The article of claim 21 and further comprising a relatively thin binder coating between the thin tubular layer and the relatively thick layer.

23. The article of claim 20 wherein the binder layer comprises an acrylic compound and the elastomeric polymer is an ECO polymer.

24. A flexible tubular article according to claim 21 and further comprising a relatively thin inner extruded layer of an elastomeric polymer bonded to the tubular layer of THV fluoropolymer.

* * * * *